Feb. 12, 1924. Re. 15,764

F. BILLINGS ET AL

LOADING MACHINE

Original Filed July 9, 1917 4 Sheets-Sheet 1

Inventors
Frank Billings and
Robert P. Greenleaf
By Thurston Kwis & Hudson
Attys.

Feb. 12, 1924. Re. 15,764

F. BILLINGS ET AL

LOADING MACHINE

Original Filed July 9, 1917 4 Sheets-Sheet 2

Inventors.
Frank Billings
and
Robert P. Greenleaf
by Thurston, Kirio & Hudson
Attys.

Feb. 12, 1924. Re. 15,764

F. BILLINGS ET AL

LOADING MACHINE

Original Filed July 9, 1917 4 Sheets-Sheet 3

Inventors.
Frank Billings
Robert P. Greenleaf
by Thurston Kurtz & Hulcan
Attys.

Feb. 12, 1924.

Re. 15,764

F. BILLINGS ET AL

LOADING MACHINE

Original Filed July 9, 1917 4 Sheets-Sheet 4

Inventors.
Frank Billings
and
Robert P. Greenley
by Thurston, Kwis & Hudson
Attys.

Reissued Feb. 12, 1924. Re. 15,764

UNITED STATES PATENT OFFICE.

FRANK BILLINGS AND ROBERT P. GREENLEAF, OF CLEVELAND, OHIO; SAID GREENLEAF ASSIGNOR TO SAID BILLINGS.

LOADING MACHINE.

Original No. 1,322,476, dated November 18, 1919, Serial No. 179,300, filed July 9, 1917. Application for reissue filed July 16, 1920. Serial No. 396,826.

*To all whom it may concern:*

Be it known that we, FRANK BILLINGS and ROBERT P. GREENLEAF, citizens of the United States, and residents, respectively, of Cleveland, in the county of Cuyahoga and State of Ohio, and Cleveland, in the county of Cuyahoga and State of Ohio, have invented a certain new and useful Improvement in Loading Machines, of which the following is a full, clear, and exact description.

This invention relates to a loading machine adapted particularly for use in mines where the head room is limited.

The principal object of the invention is to provide an improved type of machine which is efficient for loading loosened material into dump cars.

More specifically considered, the invention aims to provide a machine of the type wherein a material moving or conveying element such as a shovel or bucket is filled by being thrust forwardly into the material and is then elevated and swung rearwardly so that the contents may be dumped into cars or other receiving means at the rear of the machine, and it is one of the particular objects to accomplish this by a machine wherein the shovel or conveying element is filled by direct forward thrust, and when swung rearwardly over the machine to discharge material at the rear thereof, it will not at any point of its cycle of movement extend above the mine floor a sufficient distance to strike the overhead walls or timbering.

These results are accomplished by the present invention which may be briefly summarized as consisting in certain novel details of construction and combinations and arrangements of parts which will be described in the specification and set forth in the accompanying claims.

Figure 1:
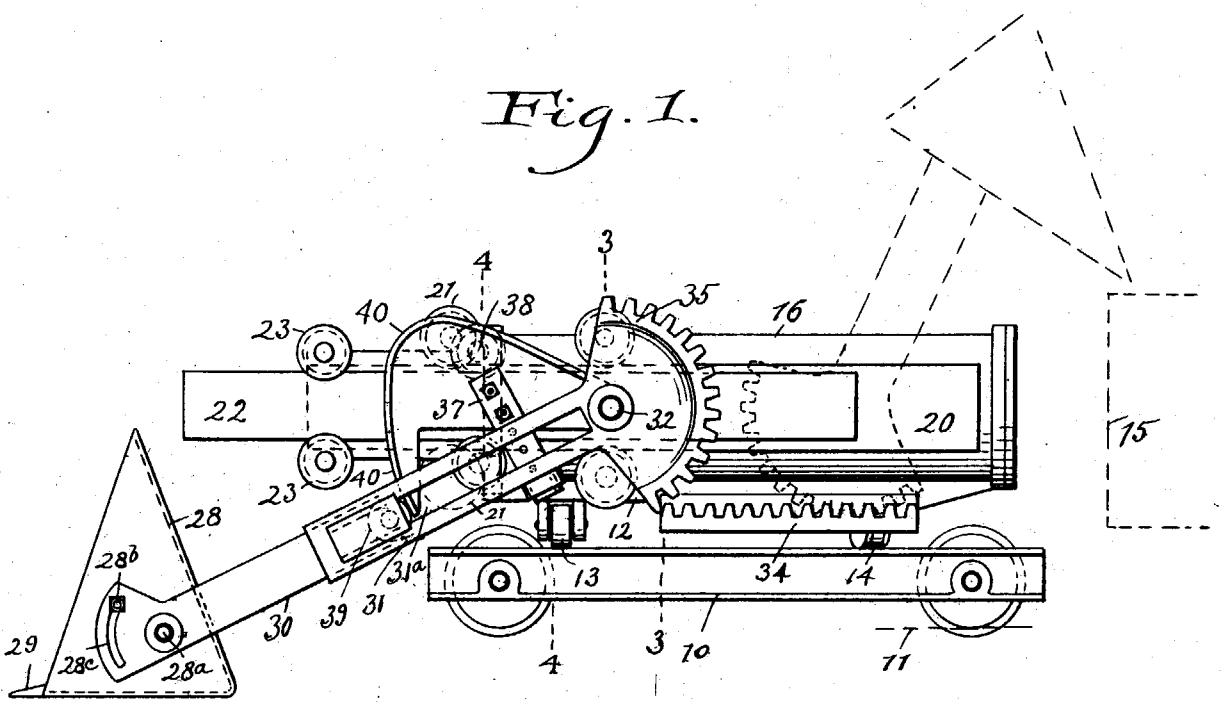
Figure 2:
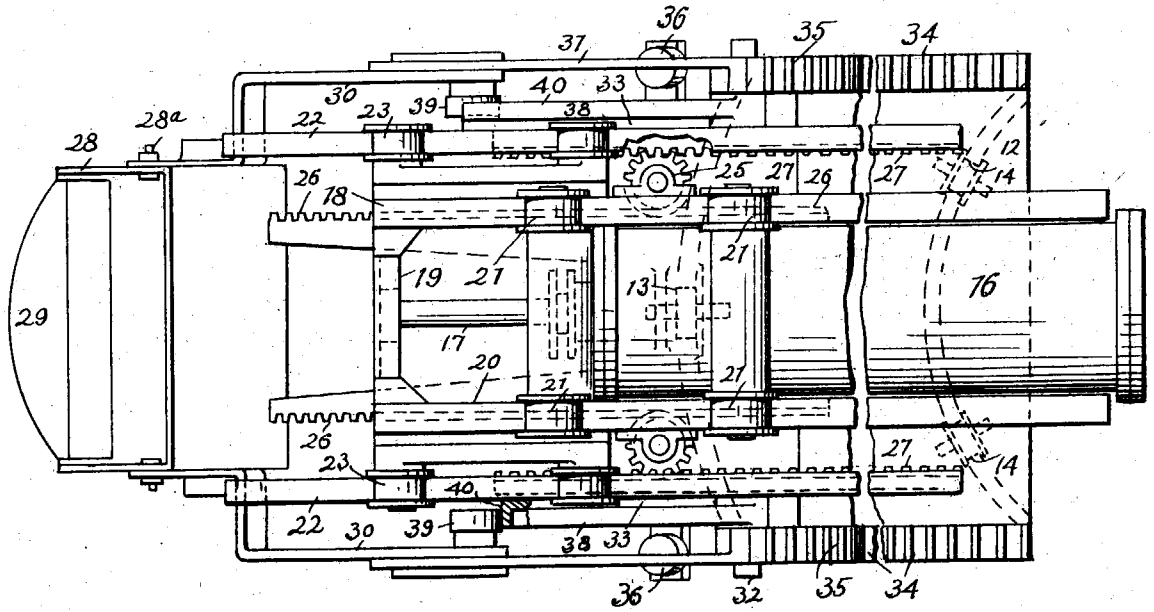
Figure 3:
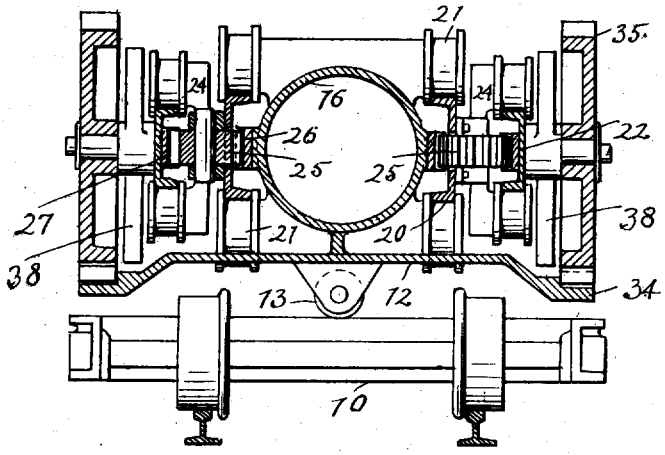
Figure 4:
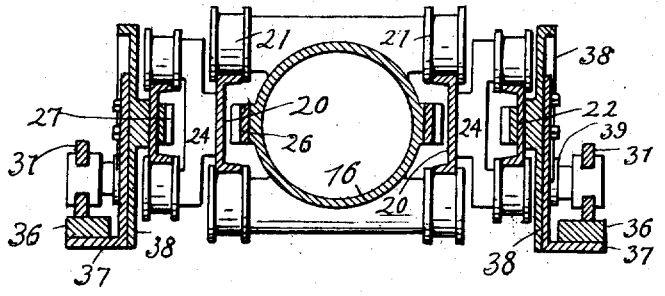
Figure 5:
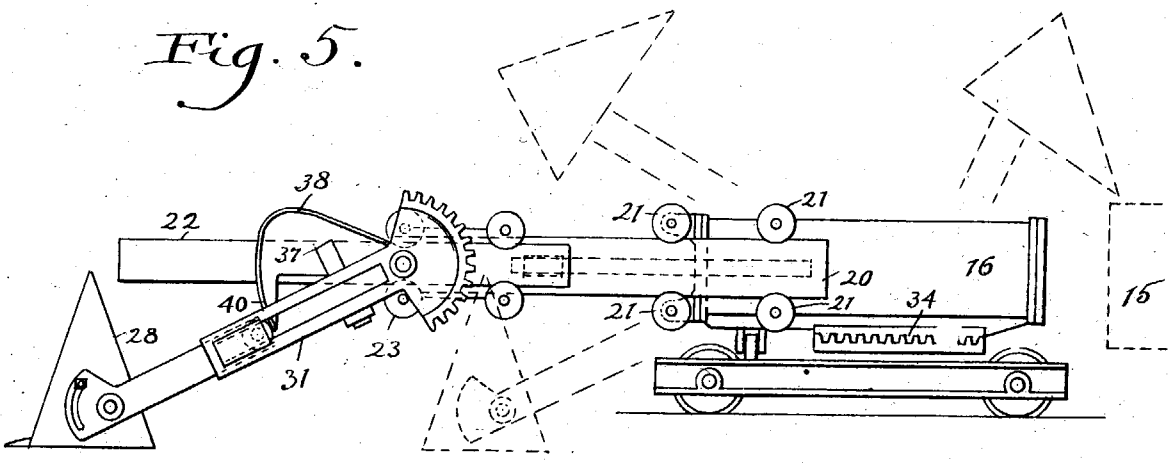
Figure 6:
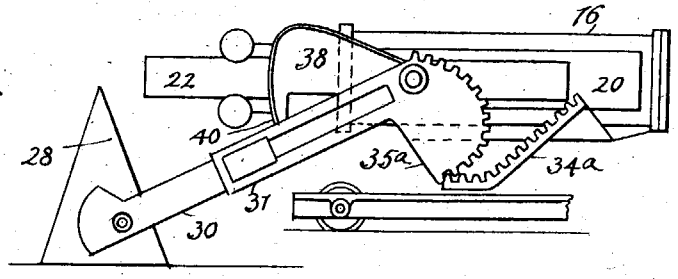

In the accompanying sheets of drawings, Figure 1 is a side elevation of the improved machine with the shovel shown by full lines at the beginning of its forward stroke, and by dotted lines at the end of its rearward stroke; Fig. 2 is a plan view of the same; Fig. 3 is a transverse sectional view substantially along the line 3—3 of Fig. 1; Fig. 4 is a transverse sectional view of the upper part of the machine substantially along the line 4—4 of Fig. 1; Fig. 5 is a side elevation similar to Fig. 1 on a reduced scale but with the ram extended, and with the bucket at the end of its forward stroke; and Fig. 6 is a side view of a portion of the machine showing a slight modification.

Referring now to the drawings, 10 represents a wheeled frame or truck adapted to run along a track indicated at 11. On this truck 10 is mounted a platform or turntable 12 which can be turned horizontally through a predetermined arc about a vertical axis, the truck in this case having curved tracks which are engaged by a front roller 13 and rear rollers 14.

On this turntable 12 is supported the mechanism for handling material, that is, for shoveling it up within a given angle in front of and to both sides of the machine and conveying it rearwardly over the machine and finally discharging it into suitable cars, a portion of one of which is indicated at 15 in Fig. 1. This mechanism in this case includes a single motor, a telescopic ram adapted to be reciprocated or slid forwardly and rearwardly, a material moving element preferably a shovel, and telescopic arms connecting the shovel to the outer or more rapidly moving part of the ram, together with devices so arranged that the shovel while passing through a complete cycle of movement is thrust forwardly near the ground level so as to be filled with material, and is then retracted and when brought up to a point near the front end of the machine is swung upwardly and rearwardly so that the material will be discharged into the car at the rear and then will be again swung forwardly and downwardly to its initial position.

In the embodiment of our invention here shown, we employ for the purpose above stated, a horizontal motor of the reciprocating fluid pressure type, air being preferably employed as the motive fluid, this motor including a cylinder 16, with a piston or plunger indicated at 17, (see particularly Fig. 2). At its forward end this plunger is connected to one member 18 of the ram, which as here shown is U-shaped and includes a front cross piece or cross head 19 and two side members 20, 20, which extend rearwardly alongside the motor cylinder 16. This ram member reciprocates in suitable supporting and guiding members comprising forward and rear rollers 21, which engage the top and bottom sides of the rearwardly extending ram members 20. The ram includes in addition to the inner ram member 18, an outer ram member consisting of two straight bars 22, which are parallel to and are on the outside of the members 20 of ram member 18. The bars composing the outer ram member are supported and guided for reciprocating movement by rollers 23 which engage the top and bottom sides of the bars 22, these rollers being journaled on castings 24 which are secured to the side bars 20 of the inner ram member. It might be here mentioned that the inner and outer ram members are preferably formed from structural material such as channels, as indicated by the cross-sectional view of Fig. 3.

The outer ram member is shifted by the motor 16 at twice the speed of the inner ram member by rack and pinion gearing consisting of pinions 25 carried by the side bars of the inner ram member, each of these pinions engaging a fixed rack 26 carried by the cylinder of the motor, and a movable rack 27 carried by one of the side bars of the outer ram member.

While we have shown a telescopic ram, a straight single member ram may be employed.

The ram actuates a shovel or bucket 28, here shown as substantially triangular shaped in cross-section and provided with an open front and preferably with a digging portion 29 at its lower front end, as shown in Fig. 1. This shovel is connected to the bars 22 of the outer ram member by two arms, each composed of telescoping parts 30 and 31, the former being connected to the sides of the shovel, and the latter being journaled on studs 32 of castings 33, secured to the bars 22 of the outer ram member. The two parts 30 and 31 of each arm have a sliding connection with each other, the part 31 having a slot $31^a$ and the part 30 having a block which engages in this slot.

After the shovel has been thrust forward and thus filled with material by the outward movement of the ram, it is moved back over the same path to the position shown by the full lines in Fig. 1, and then while the plunger of the motor and the ram are still moving rearwardly, the shovel is swung up and back over the machine to the dotted line position. This is accomplished in this case by means of racks 34 which are supported on opposite sides of the platform or turntable 12, and by gear segments 35 at the rear ends of the portions 31 of the arms which support the shovel, the segments being arranged concentrically with respect to the pivot studs or trunnions 32 of the arms. These racks are arranged in the planes of the shovel arms and of the gear segments and are so located with respect to the latter that when the shovel is retracted to substantially the full line position of Fig. 1 the segments encounter the racks so that throughout the remaining rearward movement of the ram the segments roll on these racks, swinging the arms and the shovel about the pivot studs 32, and when the shovel reaches the dotted line position of Fig. 1, the material is thrown into the car 15 or other element provided to receive the material. Then as the movement of the plunger of the motor is reversed, the gear segments roll forwardly over the racks carrying the shovel and the supporting arms forwardly and downwardly until the arms encounter the stops or bumpers 36 carried by brackets 37, which are secured to castings 38 carried by the two members 22 constituting the outer ram section. The arms rest on these stops or bumpers 36 while the shovel is being moved forwardly and rearwardly during the filling and retracting portions of the strokes of the ram and they resist the downward component of the ram thrust. The stops 36 can be adjusted in height by adjusting the positions of the brackets 37 so as to vary the normal position of the shovel and the inclination of the shovel arms during the forward and rearward movements thereof, and the position of the shovel at the outer end of the arms can be adjusted so that the bottom or digging portion of the shovel will always make the desired angle with respect to the material to be scooped up. To permit this last mentioned adjustment, the shovel has a swivel connection shown at $28^a$ with the forward arm members 30, and can be locked in any desired position by bolts $28^b$ engaging in arc shaped slots $28^c$ at the outer ends of the arm members 30.

As the shovel is being swung over the machine it is desirable that it have as small a radius of movement as possible, and to that end the shovel arms are made telescopic. Additionally we provide means whereby the arms are automatically shortened as they swing over the machine and this is accomplished by providing at the inner or rear ends of the forward arm members 30, rollers 39 which engage cam surfaces 40 on the castings 38, which as before stated, move with the outer ram members and carry the brackets 37 upon which the arms normally rest and also the pivot studs 32 about which the arms turn. These cam surfaces are so shaped that as the shovel is swinging upwardly or downwardly past the forward end of the ram the effective length of the arms between the pivot studs 32 and the forward connecting points $28^a$ will be such that the shovel will clear the ram, and to this end the forward portions of the cam surfaces consist substantially of arcs of a circle of predetermined radius, and then the cam surfaces taper downwardly. When the rollers 39 which roll over these cam surfaces reach the downwardly inclined portions of the latter the weight of the shovel and the load carried thereby cause the arms to shorten by gravity, and after the material is discharged and the shovel is returned forwardly and downwardly the arms automatically lengthen to a predetermined length sufficient to prevent the shovel striking the forward end of the ram.

With this machine, as the motor plunger moves outwardly the ram is extended and the shovel is given its filling stroke, the arms then being held rigidly at a given angle with respect to the ram and being downwardly inclined as shown in Fig. 1, with the arms resting on the bumpers or stops 36. The length of this filling stroke can be anything desired, the length and speed of the stroke being controlled by valve mechanism not here shown. After the shovel is filled the motor is reversed, whereupon the ram is retracted and the shovel is drawn rearwardly over the same path that it traversed during the forward filling stroke, and when the gear segments 35 which move forwardly and rearwardly with the ram engage the racks 34, the shovel arms and shovel are caused to be rotated back over the machine until the plunger of the motor reaches the end of its rearward stroke, whereupon the material is thrown from the shovel into the car, the shovel arms automatically shortening during this rearward swinging movement. Then when the motor is again reversed, the shovel and shovel arms are swung forwardly and downwardly, and when the shovel and arms reach the position shown by the full lines in Fig. 1, which occurs just as the gear segments 35 leave the racks 34, the next filling stroke is started and continues until the motor is reversed or reaches the end of its forward stroke. This operation can be repeated rapidly with the result that the material can be quickly loaded from in front and within a certain range to either side of the machine and discharged at the rear of the machine. As the material is cleaned up from in front of the machine the latter will be moved forwardly and the upper part of the machine can be turned when desired about the vertical axis of movement of the turntable.

The rolling action of the gear segments over the racks is an important feature of the construction because the pivot points of the swinging shovel supporting arms travel rearwardly as the shovel is being brought over the machine and this admits of a given rearward movement with less length of the shovel supporting arms than would be required if the shovel were swung rearwardly about a fixed center or axis.

When the machine is being used in the manner above explained, it will be held against forward tilting or tipping movement, particularly when the ram is extended. This can be done in any of the well known ways such as by track clamps. Or if the machine is not used on a track, the rear end can be braced against the overhead mine timbering.

It will be observed that when the shovel loaded with material is swung to dumping position, the shovel supporting arms are actuated so as to lift the load as well as move it rearwardly, the lifting effect being dependent on the radius of the gear segments. The lifting and rearward moving actions can be varied to suit the exigencies of any particular case by varying the relation of the length of the shovel supporting arms and the radius of the gear segments.

In Fig. 6 we have shown a modification in the form of the gear segments and racks which are employed to give the shovel supporting arms the rolling action as they are swung over the machine. As here shown, the gear segments $35^a$ are spiral shaped, the teeth which first engage the racks being a considerably greater distance from the center of rotation than the teeth which last engage the racks, the pitch line of the teeth being in the form of a spiral which gradually approaches the center of rotation. In order that the center of rotation may have a movement of translation in a straight horizontal direction while the rolling action is taking place with the spiral segments $35^a$, the racks here designated $34^a$, are inclined upwardly from a point near their forward ends to their rear ends. These racks are, of course, secured to the turntable as in the first instance, and when the shovel is retracted the segments will engage the racks and roll over the same causing the shovel and arms to swing over the machine in the manner first described. However, with the present form of gearing the shovel filled with material can be more readily lifted or elevated at the start of the upward rearward swinging movement because the spiral gear segments give a greater leverage than the ordinary gear segments of the first described construction, and this leverage gradually decreases as the spiral segments roll over the racks and as the shovel gradually approaches the overhead position.

While we have shown the preferred construction we do not wish to be confined to the precise details shown, but aim in our claims to cover all modifications which do not involve a departure from the spirit and scope of our invention.

Having described our invention, what we claim is:

1. In a loading machine, a frame or truck, a material moving element and means for giving the said element a forward and rearward movement and a swinging movement over the machine to dumping position comprising forwardly and rearwardly movable actuating members, one of which is movable forwardly and rearwardly relative to the other, and a pivoted arm connected to said material moving element and to said relatively movable actuating member.

2. In a loading machine, a supporting truck, a conveying and loading element, means for giving said element a power actuated thrust forwardly beyond the forward end of the machine to fill the same, and for retracting said element, comprising a forwardly and rearwardly movable reciprocating ram, a motor for actuating the ram, pivoted arms connecting said conveying and loading element to the ram, and means whereby after a predetermined rearward movement of the ram, said arms are caused to be swung upwardly and rearwardly to carry said element to dumping position.

3. In a loading machine, a truck, a reciprocating telescopic ram mounted on the truck, guiding and supporting means therefor, a conveying element, swinging arms connecting said element to the ram, and mechanism for causing the ram to be thrust forwardly then retracted and when retracted to a certain point for swinging said arms so as to carry said element upwardly and rearwardly over the machine.

4. In a loading machine, a truck, a reciprocating ram guided for forward and rearward reciprocating movement, a material moving element, a swinging arm connected to said element and to the ram, and means for actuating the ram and arm so that said element will be thrust forwardly and then retracted and swung upwardly and rearwardly over the machine, said arm being composed of telescopic parts which slide relative to each other when swinging over the machine.

5. In a loading machine, a truck, a ram mounted for forward and rearward reciprocating movement, a shovel, swinging arms connected with the shovel and to the ram and each composed of relatively movable parts, motive means for reciprocating the ram so as to move the shovel forwardly and rearwardly and for swinging said arms to swing the shovel rearwardly or forwardly over the machine, and separate means for causing the shovel arms to automatically shorten and lengthen while the arms are being swung.

6. In a loading machine, a truck, a shovel, power operated means for giving said shovel a forward thrust beyond the forward end of the machine that it may be filled with material and also for retracting the shovel, comprising a ram mounted for forward and rearward reciprocating movement, a motor for actuating the ram, swinging arms connecting the shovel to the ram, and means for causing the arms to have a turning and rolling movement comprising racks carried by the truck and gears at the rear ends of the arms and adapted to engage the racks.

7. In a loading machine, a truck, a shovel, means for operating the shovel so as to give the same forward and rearward reciprocating movements and swinging movements forwardly and rearwardly over the machine, said means comprising forwardly and rearwardly reciprocating shovel actuating members, one of which is movable back and forth relative to the other, and swinging arms having their forward ends connected to the shovel, and at their rear ends connected to said relatively movable actuating member, and gearing for causing the movement of said second actuating member to rotate the arms.

8. In a loading machine, a truck, a ram composed of two telescopic parts, motive means for actuating one of said parts of the ram, and means whereby the other part of the ram is caused to move forwardly or rearwardly at a greater speed than the part to which motive means is connected, a shovel, swinging arms connected to the shovel and pivotally supported on the more rapidly moving part of the ram, said arms adapted to be swung upwardly and rearwardly when the ram is retracted and downwardly and forwardly when the ram is moved forwardly, the arms being composed of telescopic parts and means carried partly by the more rapidly moving member of the ram and partly by the arms for causing the arms to lengthen and shorten during the swinging movements of the arms.

9. In a loading machine, a frame, a shovel adapted to be filled with material at the front of the machine and to be swung over the latter to dumping position, a shovel actuating ram composed of telescopic parts including a part movable relative to the frame and a second part movable relative to the first, and swinging means connecting the shovel to said second part of the ram.

10. In a loading machine, a frame, a shovel adapted to be filled with material at the front of the machine and to be swung over the machine to dumping position, a shovel actuating telescopic ram including a motor actuated part movable relative to the frame, and a second part movable relative to the first part and actuated thereby, and swinging means connecting the shovel to said second part of the ram.

11. In a loading machine, a frame, a shovel adapted to be filled with material at the front of the machine and to be swung over the machine to dumping position, a shovel actuating telescopic ram including a motor actuated part movable relative to the frame, and a second part movable relative to the first part and actuated thereby, and swinging means connecting the shovel to said second part of the ram, and means for imparting a turning movement to the shovel and said swinging means.

12. In a machine of the character described, a frame, a shovel adapted to be filled with material at the front of the machine and to be swung upwardly and rearwardly over the latter to dumping position, a forwardly and rearwardly movable shovel actuating part, swinging means connecting the shovel to said part, said swinging means being composed of relatively movable parts by which the effective length of said swinging means may be varied as the shovel is being swung over the machine.

13. In a loading machine, a frame, a shovel adapted to be filled with material at the front of the machine and to be swung upwardly and rearwardly over the latter to dumping position, a forwardly and rearwardly movable shovel actuating part, swinging means connecting said shovel to said part and composed of telescopic arms and means whereby said arms are moved relatively during the swinging movements thereof.

14. In a loading machine, a frame, a shovel adapted to be filled with material at the front of the machine and to be swung upwardly and rearwardly over the latter to dumping position, a forwardly and rearwardly movable shovel actuating part, swinging means connecting said shovel to said part and composed of telescopic arms and means whereby said arms are moved relatively during the swinging movements thereof, said means comprising a cam carried by said forwardly and rearwardly movable part, and a roller carried by one of the arms and engaging the cam.

15. In a loading machine, a shovel mounted for forward and rearward motion and for vertical swinging motion, power means for giving the shovel a forward filling stroke and means for swinging the shovel including a rack and a gear, one of which acts on the other with varying leverage.

16. In a loading machine, a shovel and power operated mechanism for giving the shovel a filling movement and a lifting movement for dumping purposes, the lifting means including an element through which force is transmitted through a leverage which is at a maximum at substantially the time of greatest resistance to lifting, and which gradually decreases as dumping position is approached.

17. In a loading machine, a shovel and power operated mechanism for giving the shovel a filling movement and a swinging movement to dumping position, the swinging means providing maximum leverage for the transmission of force at substantially the time of greatest resistance and reduced leverage as the resistance is reduced.

In testimony whereof, we hereunto affix our signatures.

FRANK BILLINGS.
ROBERT P. GREENLEAF.